Aug. 26, 1941. J. S. CAVALCANTE Re. 21,884
APPARATUS FOR PULLING TAPE
Original Filed March 1. 1932 2 Sheets-Sheet 1
Fig. 4a
Fig. 1.
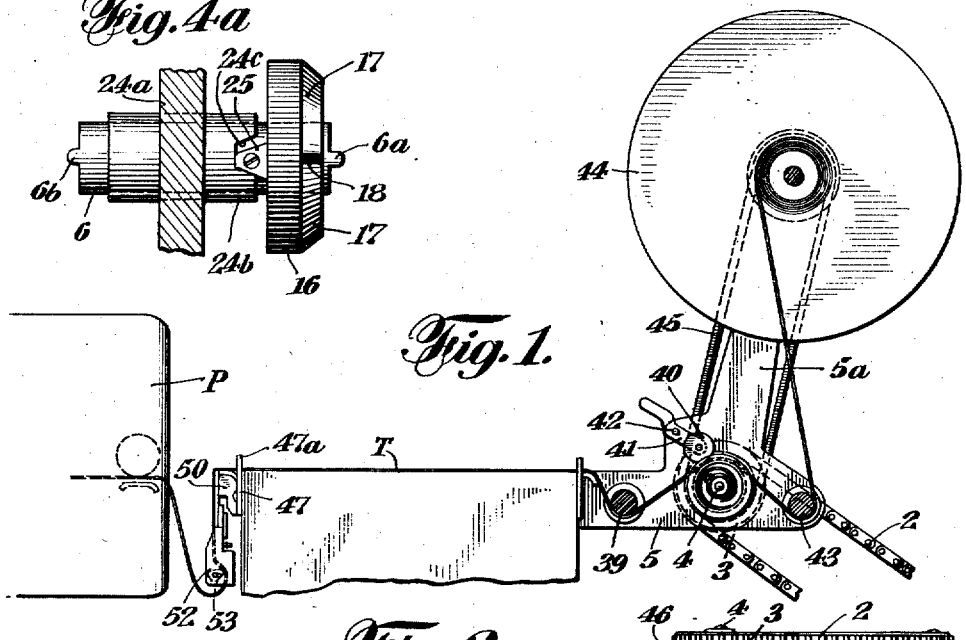
Fig. 2.
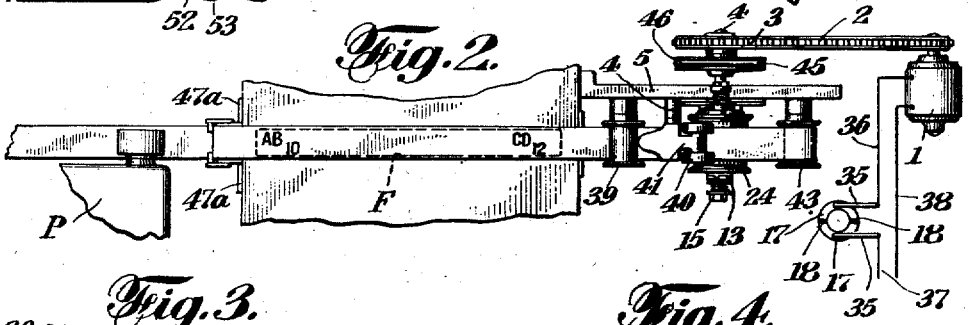
Fig. 3.
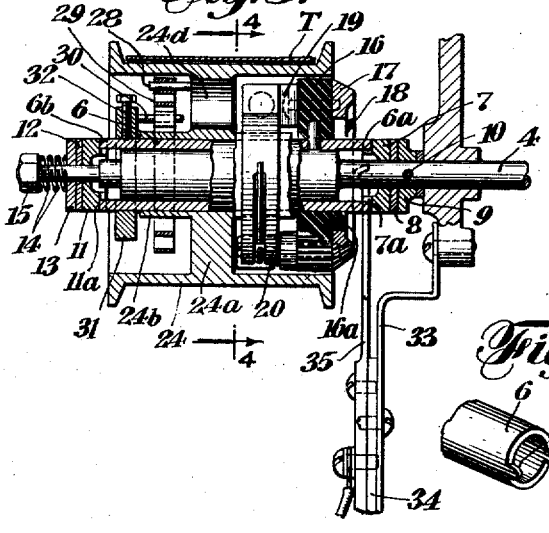
Fig. 4.
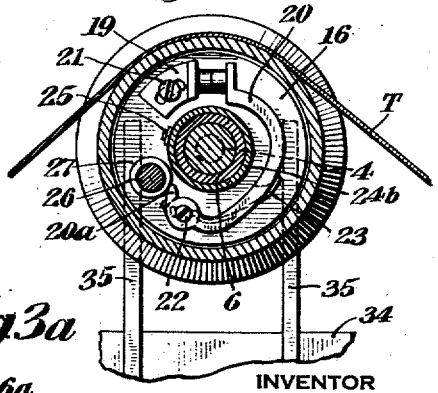
Fig. 3a
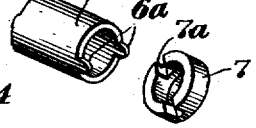
INVENTOR
Jonathan S. Cavalcante
BY
Ward, Crosby & Hack
ATTORNEYS Aug. 26, 1941. J. S. CAVALCANTE Re. 21,884

APPARATUS FOR PULLING TAPE

Original Filed March 1, 1932 2 Sheets-Sheet 2

INVENTOR
Jonathan S. Cavalcante
BY
Ward, Crosby & Neal
ATTORNEYS

Reissued Aug. 26, 1941

Re. 21,884

UNITED STATES PATENT OFFICE 21,884

APPARATUS FOR PULLING TAPE

Jonathan S. Cavalcante, Brooklyn, N. Y., assignor to Trans-Lux Corporation, a corporation of Delaware Original No. 2,134,998, dated November 1, 1938, Serial No. 596,143, March 1, 1932. Renewed March 29, 1938. Application for reissue December 7, 1939, Serial No. 308,013

6 Claims. (Cl. 271—2.3)

My invention relates to apparatus for pulling or drawing a tape, web or the like.

My invention, in a prominent phase thereof, relates to a tape-pulling arrangement operative in a highly satisfactory manner for pulling tape through a projection field, or equivalent.

Various other objects, advantages and characteristics of my invention will become apparent from the following detailed description taken in connection with the accompanying drawings.

My invention resides in the apparatus, arrangements and features of the character hereinafter described and claimed.

For an understanding of my invention and for an illustration of one of the many forms thereof, reference is to be had to the accompanying drawings, in which:

Figure 1 is an elevational view illustrative of a form of my invention;

Fig. 2 is a plan view of the arrangement shown in Fig. 1;

Fig. 3 is a transverse, vertical sectional view, partly in elevation, of novel mechanism controlled by tape tension in accordance with my invention;

Figure 5:
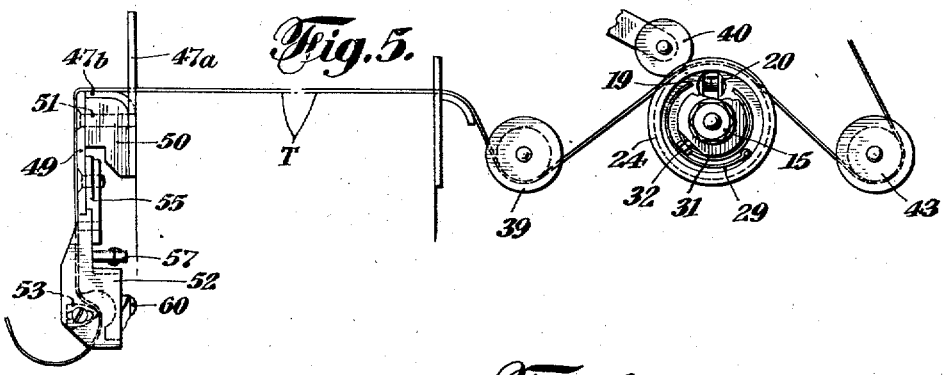
Figure 6:
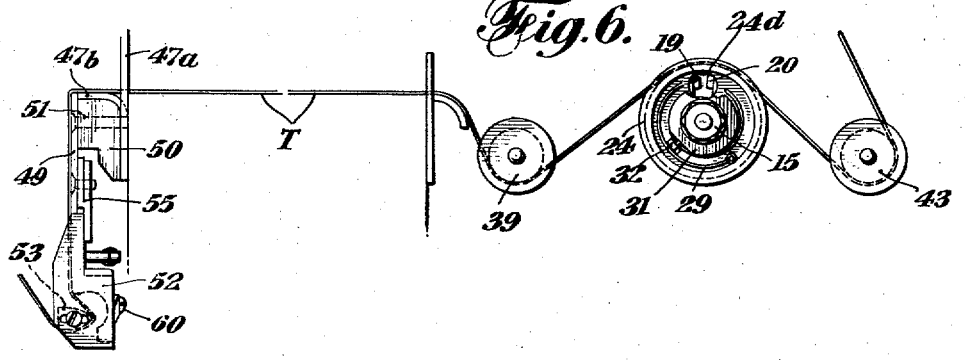
Figure 7:
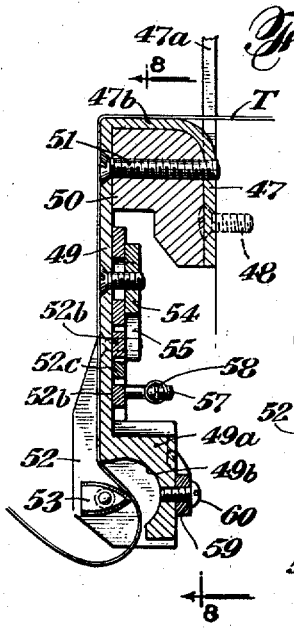
Figure 9:
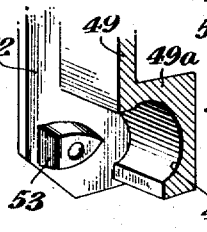
Figure 8:
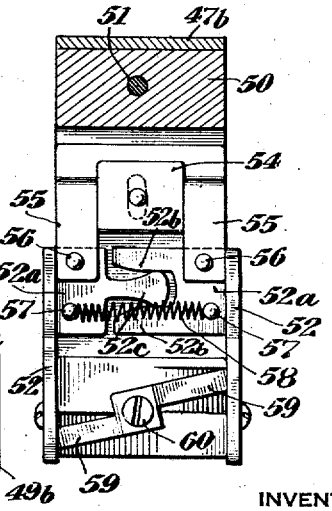

Fig. 3*a* is a perspective view of parts of a clutch device as constructed in accordance with my invention;

Fig. 4 is a transverse, vertical sectional view taken substantially on the line 4—4 of Fig. 3 looking in the direction of the arrows;

Fig. 4*a* is a plan view of parts of the mechanism shown in Figs. 3 and 4;

Fig. 5 is a diagrammatic elevational view of my tape pulling arrangement showing the tape in non-tensioned condition between the projection field and the printing mechanism;

Fig. 6 is a diagrammatic elevational view of my tape pulling arrangement showing the tape in tensioned condition between the projection field and the printing mechanism;

Fig. 7 is a vertical sectional view, partly in elevation, of part of the mechanism shown in Figs. 5 and 6;

Fig. 8 is a transverse, vertical sectional view, partly in elevation, and is taken on the line 8—8 of Fig. 7 looking in the direction of the arrows; and Fig. 9 is a perspective view of a part of the mechanism shown in Fig. 7.

Referring to the drawings, T represents any suitable tape or web such, for example, as issues from any suitable printing mechanism P herein illustrated as being a conventional stock ticker. As the parts are related in Figs. 1 and 2, the tape T is emitted from the printing mechanism P and then passes from left to right from said printing mechanism through or across any suitable projection field F, Fig. 2. As is well understood in the art, tape issues from a stock ticker in a pulsating, irregular manner while, for projection purposes, it is highly desirable that the tape move through the projection field in a regular, uniform manner. In accordance with my invention, the latter is accomplished in a highly desirable and novel way as will hereinafter be described.

Referring particularly to Fig. 2, 1 represents any suitable motor such, for example, as an electric motor, the armature shaft of which operates a suitable endless chain 2, or equivalent, said chain driving a suitable sprocket wheel 3 secured to a shaft 4 for rotatable movement therewith. The shaft 4 is journaled in a frame 5 which may be carried by the structure forming the projection field F.

Rotatable on the shaft 4 is a sleeve 6 having suitable clutch devices coactable with the respective opposite ends thereof. Accordingly, one end of said sleeve 6 may be provided with axially extending sections 6*a*, 6*a*, adapted to be received in the transverse slot 7*a* of a washer 7 freely rotatable and slidable on the shaft 4. Spaced from the washer 7 by a washer 8 of felt or the like is a washer 9 secured to said shaft 4 for rotatable movement therewith by a suitable pin arrangement 10. The other end of the sleeve 6 may also be provided with axially extending sections 6*b*, 6*b* adapted to be received in the transverse slot 11*a* of a washer 11 freely rotatable and slidable on a reduced end of the shaft 4. Spaced from the washer 11 and disposed on said shaft 4 are washers 12 and 13, the washer 12 being of felt or the like. Coactable with the outer face of the washer 13 is a spring 14 maintained under tension by the nut 15.

As stated, the washers 8 and 12, preferably, are of felt whereas the washers 7, 9, 11 and 13 are preferably of metallic or other non-yieldable material. Accordingly, with the parts described above positioned as shown in Fig. 3 and with the spring 14 under suitable tension, it results that the sleeve sections 6*a* are yieldingly retained in the slot 7*a* of the washer 7 and the sleeve sections 6*b* are similarly retained in the slot 11*a* of the washer 11. Therefore, if the sleeve 6 is substantially free from restraint against turning movement, rotation of the shaft 4 imparts similar rotative movement to said sleeve 6, this action occurring because of the driving relation obtaining by reason of the disposition of the sleeve sections 6a and 6b in the respective slots 7a and 11a. However, if a force of sufficient magnitude is applied to the sleeve 6 resistant to rotation thereof, the spring 14 becomes compressed whereby the parts slide axially of the shaft 4 to disengage the sleeve sections 6a and 6b from the respective slots 7a and 11a. Under such circumstances, rotation of the shaft 4 continues while the sleeve 6 remains stationary.

Suitably secured to the sleeve 6 for rotative movement therewith is a collar 16 of suitable electricity-insulating material, such as hard rubber. The collar 16 may comprise a hub 16a which carries segmental members 17, 17, Fig. 4a, formed from suitable electricity-conducting metallic material. As shown, the members 17, 17 are spaced from each other by slots 18. Carried by that face of the collar 16 opposite the face to which the aforesaid members 17, 17 are secured are contact members 19 and 20 terminating, respectively in contact elements adapted to engage each other as shown in Fig. 4. As shown, the contact member 19 is secured, preferably, in an adjustable manner circumferentially of the shaft 4 and to the collar 16, by a screw 21 of electricity-conducting material, said screw 21 being threaded into one of the segmental members 17. The contact member 20 is pivoted on a screw 22 of electricity-conducting material, said screw 22 being threaded into the other segmental member 17. The contact member 20 comprises a tail section 20a utilizable as hereinafter described, and said contact member 20 is suitably biased in a counterclockwise direction, Fig. 4, as by a spring 23 having one end suitably secured to the aforesaid screw 22.

Referring particularly to Figs. 3 and 4, a roller 24 is shown as having an inner lateral wall section 24a terminating in a sleeve 24b freely slidable on the aforesaid sleeve 6. The sleeve 24b to the right of the lateral wall section 24a is formed with a V-shaped notch 24c which receives a corresponding V-shaped member 25 carried on the exterior surface of the sleeve 6. As shown, the dimensions of the member 25 are somewhat smaller than those of the notch 24c, whereby the roller 24 is permitted limited rotative movement on and with respect to the sleeve 6. Otherwise, the member 25 serves as a key which retains the roller 24 on the sleeve 6 so as to rotate therewith. The aforesaid lateral wall section 24a, on the same side thereof as the aforesaid notch 24c, carries a member 26 covered by a member 27 of suitable electricity-insulating material, the tail section 20a on the contact member 20 being adapted to coact therewith as hereinafter described.

The hereinbefore described wall section 24a may have an opening 24d extending therethrough and said wall section 24a carries a member 28 projecting laterally therefrom on the side thereof opposite the aforesaid notch 24c. One end of a helical spring 29 is secured to the member 28 while the other end of said spring 29 coacts with a member 30 laterally carried by a ring 31 secured in a desired rotated position on the sleeve 6 by a set screw 32.

Depending from the frame 5 is a suitable bracket 33, Fig. 3, to which a sheet 34 of suitable electricity-insulating material is suitably secured, the latter supporting spaced contact members 35, 35 which, at their upper ends, are adapted to ride upon the hereinbefore described segmental members 17, 17. As shown in Fig. 2, one of the contact members 35 is connected to a conductor 36 which leads to one terminal of the motor 1, the other contact member 35 having connected thereto a conductor 37 which leads to one terminal of a suitable source of current, not shown, the other terminal of which is connected by a conductor 38 to the other terminal of said motor 1.

Referring to Figs. 1 and 2, the aforesaid frame 5 is shown as carrying a lateral roller 39 beneath which the tape T passes after leaving the projection field. Beyond the roller 39, the tape T engages the upper section of the roller 24 and is suitably maintained in driving engagement therewith, as by a roller structure 40 carried by a lever 41 pivoted at 42 to said frame 5, the roller 40 being biased in any suitable manner toward the roller 24. Beyond the last named roller, the tape T may pass beneath a roller 43 extending laterally from the frame 5 and then, if desired, to a rewind reel 44 rotatably carried by an upwardly extending section 5a of the frame 5. The rewind reel 44 may be operated in any suitable manner, as by a spring belt 45 which rotates a pulley carried by the shaft of the rewind reel, said belt 45 being operated by a pulley 46 carried by the aforesaid shaft 4, Fig. 4.

In accordance with one phase of my invention, there may be disposed at the entrance to the projection field a novel arrangement for applying a retarding force to the tape T each time that operation of the printing mechanism P is discontinued. This arrangement may take any one of a number of desirable forms but, as herein illustrated, is shown as comprising a frame 47 which is suitably secured, as by one or more screws 48, Fig. 7, to that surface of the projector which faces the printing mechanism P. The frame 47 may have upwardly extending sections 47a, 47a, Fig. 2, for the passage of the tape T therethrough and it also preferably comprises a horizontal section 47b extending toward the printing mechanism P, said horizontal section 47b forming a support across which the tape T horizontally moves just prior to the entrance thereof into the projection field F.

Depending from the horizontal frame section 47b is a plate section 49 which may be anchored in vertical position by a spacing block 50, a screw 51 extending through said plate section 49, said block 50 and into the frame 47 to anchor said plate section 49 and block 50 in the position shown in Fig. 7. As is clearly shown on the drawing, the plate section 49 comprises a lower section 49a extending toward the projector, said section 49a being interiorly formed with a curved passageway 49b adjacent which the tape passes during operation of the tape-pulling mechanism. Extending laterally along the respective opposite lower sides of the plate section 49 are members 52, 52, each of which, on the lower interior surface thereof, carries a member 53 more or less wedge-shaped with the apex of the wedge directed toward the projector, and said members 53 being adjustable toward or from the projector if desired. If desired, although not necessarily, the members 52, 52 may be adjustable with respect to the plate section 49. Thus, as herein shown, the surface of the plate section 49 facing the projector has a spacing block 54 suitably secured thereto and, along respective opposite sides of said block 54, members 55 are secured to said plate section 49 in spaced relation with respect to the rear surface thereof. The respective members 52 comprise lateral sections 52a freely disposed between the plate section 49 and the respective members 55. As shown, said lateral sections 52*a* are pivoted at 56 to the respective members 55 and further, as shown, one of the lateral sections 52*a* may be fork-shaped as indicated at 52*b*, Fig. 8, an end extension 52*c* of the other lateral section 52*a* being snugly received between the fork parts 52*b*. As a result, any pivotal movement of one of the members 52 is transmitted to the other member 52 so that both are movable in unison. As illustrated, each lateral section 52*a* carries a member 57 to which the respective ends of a helical spring 58 are suitably secured.

As clearly appears in Fig. 8, the rear face of the lower plate section 49*a* has a member 59 secured thereto by a screw 60. As the member 60 is positioned in Fig. 8, the opposite ends thereof are flush with the respective outer surfaces of said section 49*a*. However, the screw 60 may be slightly retracted and the member 59 moved to a desired extent in a clockwise direction, Fig. 8; is so doing, the members 52 are swung on their respective pivots whereby they are spaced farther apart as desired whereupon the screw 60 may be tightened. This operation is performed when it may become necessary to feed tape between the members 52 of a greater width than the distance between the inner surfaces of said members 52 when they are positioned as shown on the drawings.

It shall be distinctly understood that my invention is not to be limited to the utilization of adjustable parts as described immediately above. Thus, for example, the members 52 may be secured in fixed relation to the plate section 49, the distance between said members 52 being so chosen that they will readily receive tape of any width which may be fed through the projector.

The operation is as follows:

When the tape T is in operative pulling position with respect to the various parts as shown in Figs. 1, 2 and 5, it will be noted that said tape extends from the printing mechanism P downwardly, more or less in free loop formation, then upwardly between the members 52, and then through the passageway 49*b* where opposite edges of said tape are positioned adjacent the members 53, respectively. Above said last named members, the tape passes vertically along the plate section 49, then horizontally along the frame section 47*b*, between the members 47*a*, and thence into and across the projection field F. Beyond the projection field, the tape passes beneath the roller 39 and between the rollers 24 and 40, the latter holding the tape in driving engagement with the roller 24. Beyond the last named roller, the tape passes beneath the roller 43 and then upwardly to the rewind reel 44.

It will be understood that the projector mechanism, which includes the hereinbefore described projection field F, comprises a suitable source of light, lenses, mirrors and a screen, not shown, whereby images of the characters of any tape section in the projection field are obtained on the screen.

When the tape-pulling mechanism comprising the roller 24 and associated parts are in pulling condition, the spring 29, which previously has been placed under suitable tension by the collar 31, biases the roller 24 in such direction that the member 25 is related to the recess 24*c* as shown in Fig. 4*a*. At this time, the tail section 20*a* of the contact member 20 is removed from the members 26, 27 as shown in Fig. 4, and the contact members 19 and 20 are closed. As a result, the circuit through the motor 1 is closed, this circuit extending from one terminal of the source of current to one terminal of said motor 1 by way of the conductor 37, the contact member 35 connected thereto, the segmental member 17 associated with said last named contact member 35, the contact member 19 or 20 connected to said last named segmental member 17, the other contact member 19 or 20, the segmental member 17 connected to the last named contact member, the contact member 35 associated with said last named segmental member, and conductor 36. The other terminal of the motor 1 is connected to the other terminal of the source of current by the conductor 33.

With the motor circuit thus closed, the shaft 4 is rotated, said shaft operating the rewind reel 44 and the roller 24, the roller last named being operated due to the driving connection between the member 25 and the wall of the recess 24*c* with which said member 25 coacts as shown in Fig. 4*a*. The roller structure 40 retains the tape in engagement with the roller 24 and, accordingly, rotation of the latter causes the tape to be pulled through the projection field F for the useful purpose stated above.

The operation last described continues during operation of the printing mechanism P or while a more or less free tape loop exists around the members 53 as shown in Figs. 1, 5 and 7. However, when operation of the printing mechanism is discontinued, this more or less free loop is rather quickly eliminated during further operation of the roller 24. When said loop is thus eliminated, the tape is drawn into binding relation with respect to the members 53 as shown in Fig. 6 and, as a result, a retarding force is applied to the tape whereby it is placed under tension. When the tape is thus retarded or placed under tension, rotative movement of the roller 24 is discontinued and, due to the then existing rotation of the shaft 4, the sleeve 6, insulating member 16 and parts carried thereby move with respect to said roller 24 to the extent permitted by the recess 24*c*. In so doing, the tail section 20*a* is brought into engagement with the member 27 and the contact members 19 and 20 are opened to thereby open the circuit of the motor 1 which stops as soon as the inertia of its armature is overcome.

Due to the fact that the anchored tape is now holding the roller 24, sleeve 6, insulating member 16 and associated parts in stationary position, the clutch devices at opposite ends of the sleeve 6 open to permit stopping of the motor armature as described above without damage to the tape.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a tape-pulling system, coacting rollers for drawing a character-bearing tape through a projection field after ejection thereof from a printing mechanism, a motor directly connected to one of said rollers, stationary surfaces with which said tape frictionally coacts to increase the tension thereof, said stationary surfaces constituting the sole means for applying friction to said tape, and means whereby such increase in the tape tension causes discontinuation of tape movement under the control of said motor.

2. In a tape-pulling system, means for drawing a character-bearing tape through a projection field after ejection thereof from a printing mechanism, a stationary surface with which said tape frictionally coacts, when operation of said printing mechanism is discontinued, to increase the tape tension, said stationary surface constituting the sole means for applying friction to said tape, and means whereby such increase in the tape tension causes discontinuation of tape movement under the control of said drawing means.

3. In a tape-pulling system, a motor, a roller operated by said motor for pulling a tape through a projection field, a switch, means controlled by said roller for operating said switch to open the circuit of said motor in response to increase in tension of said tape and for operating said switch to close the circuit of said motor in response to decrease in tension of said tape, and clutch mechanism between said roller and motor.

4. In a tape-pulling system, means for drawing a character-bearing tape through a projection field after ejection thereof from a printing mechanism, a motor directly connected to said means, stationary surfaces with which said tape frictionally coacts to increase the tension thereof when operation of said printing mechanism is discontinued, said stationary surfaces constituting the sole means for applying friction to said tape, and means whereby such increase in the tape tension causes discontinuation of tape movement under the control of said motor.

5. In a tape-pulling system, means for drawing a character-bearing tape through a projection field after ejection thereof from a printing mechanism, spaced members with which the tape is adapted to engage as it passes from the printing mechanism to said projection field, a support for each of said spaced members, said supports being mounted in such manner that they are incapable of relative movement toward or from each other, said members causing a section of the tape between said projection field and said printing mechanism to be generally of S-configuration whereby, when operation of said printing mechanism is discontinued, the frictional engagement of said tape with said members is increased, and means whereby such increase in friction on the tape causes discontinuation of tape movement under the control of said drawing means.

6. In a tape-pulling system, means for drawing a character-bearing tape through a projection field after ejection thereof from a printing mechanism, spaced members with which the tape is adapted to engage as it passes from the printing mechanism to said projection field, means for mounting said spaced members in such manner that they are incapable of relative movement toward or from each other, said members causing a section of the tape between said projection field and said printing mechanism to be generally of S-configuration whereby, when operation of said printing mechanism is discontinued, the frictional engagement of said tape with said members is increased, and means whereby such increase in friction on the tape causes discontinuation of tape movement under the control of said drawing means.

JONATHAN S. CAVALCANTE.